United States Patent
Tanishima

(10) Patent No.: US 7,771,310 B2
(45) Date of Patent: Aug. 10, 2010

(54) DRIVE STATE SHIFT CONTROL APPARATUS FOR HYBRID VEHICLE

(75) Inventor: Kaori Tanishima, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 398 days.

(21) Appl. No.: 11/796,894

(22) Filed: Apr. 30, 2007

(65) Prior Publication Data

US 2007/0259755 A1 Nov. 8, 2007

(30) Foreign Application Priority Data

May 2, 2006 (JP) .............................. 2006-128436

(51) Int. Cl.
*B60W 10/08* (2006.01)
(52) U.S. Cl. .................. 477/5; 903/945; 180/65.21; 180/65.275
(58) Field of Classification Search .................. None
See application file for complete search history.

(56) References Cited

U.S. PATENT DOCUMENTS

| 6,244,368 | B1 | 6/2001 | Ando et al. |
| 6,368,249 | B1* | 4/2002 | Hubbard ...................... 477/121 |
| 6,623,403 | B2* | 9/2003 | Ishiguro et al. ............. 477/120 |
| 6,884,199 | B2* | 4/2005 | Notsu et al. ..................... 477/5 |
| 7,037,238 | B2* | 5/2006 | Sakamoto et al. ........... 477/110 |
| 7,360,616 | B2* | 4/2008 | Schiele .................. 180/65.265 |
| 2003/0176256 | A1* | 9/2003 | Kamichi et al. ................ 477/5 |
| 2005/0155803 | A1 | 7/2005 | Schiele |

FOREIGN PATENT DOCUMENTS

| JP | HEI 10-002241 | 1/1998 |
| JP | 11-082260 | 3/1999 |
| JP | 2000-255285 | 9/2000 |
| JP | 2000-224714 A | 11/2000 |
| JP | 2003-212003 A | 7/2003 |
| JP | 2003-293816 | 10/2003 |
| JP | 2006-131037 A | 5/2006 |

\* cited by examiner

*Primary Examiner*—David D Le
*Assistant Examiner*—Justin Holmes
(74) *Attorney, Agent, or Firm*—Young Basile

(57) ABSTRACT

A drive state shift control apparatus for a hybrid vehicle and a control method for a hybrid vehicle smoothly perform a shift in drive state in accordance with an operating state by a mode shift and a gear shift. When an accelerator operation causes a mode shift request and a gear shift request at substantially the same time, vehicle information including at least one of the vehicle speed and the engine load is used to determine the sequence of the shifts based on the competing interests of shock control and responsiveness.

23 Claims, 11 Drawing Sheets

FIG.6

| SHIFTING FRICTION ELEMENTS / GEARS | I/C | H&LR/C | D/C | R/B | Fr/B | LC/B | FWD/B | 1st/OWC | 3rd/OWC | FWD/OWC |
|---|---|---|---|---|---|---|---|---|---|---|
| FIRST | | ● | | | ● | ● | ○ | ○ | ○ | ○ |
| SECOND | | | ○ | | ● | ● | ○ | | ○ | ○ |
| THIRD | | ○ | ○ | | ● | | ○ | | ○ | |
| FOURTH | ○ | ○ | ○↑ | | ↑ | | ○ | | | |
| FIFTH | ○ | ○ | | | ○ | | ○ | | ○ | |
| REVERSE | | ● | | ○ | ● | | | ○ | ○ | |

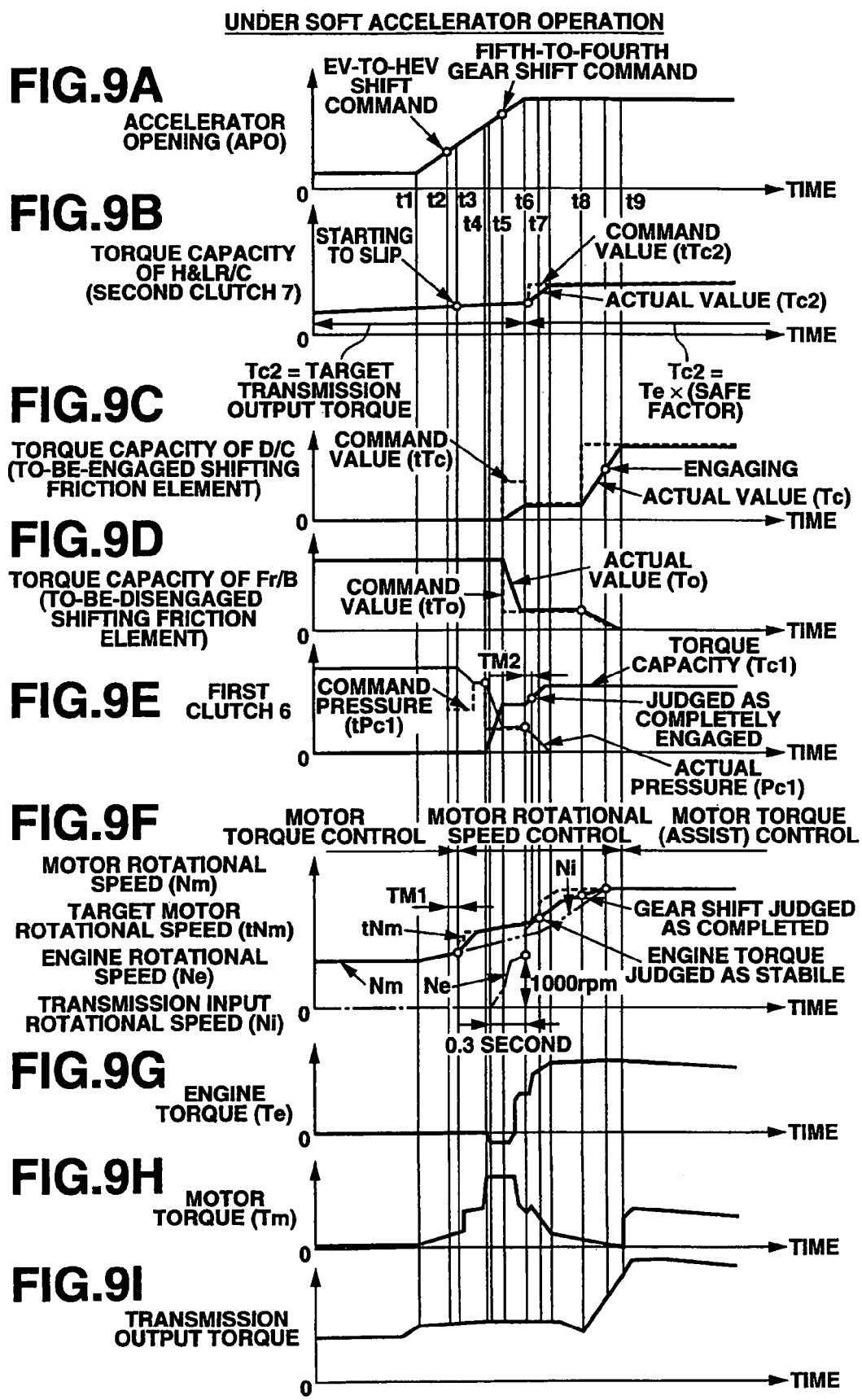

UNDER HARD ACCELERATOR OPERATION

FIG.10A ACCELERATOR OPENING (APO)

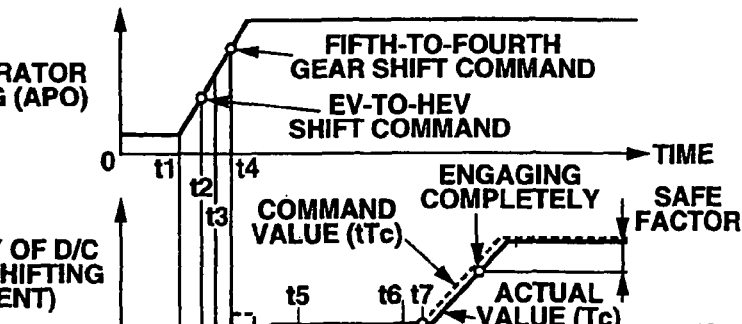

FIG.10B TORQUE CAPACITY OF D/C (TO-BE-ENGAGED SHIFTING FRICTION ELEMENT)

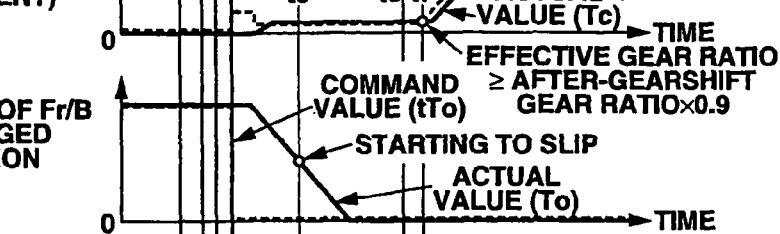

FIG.10C TORQUE CAPACITY OF Fr/B (TO-BE-DISENGAGED SHIFTING FRICTION ELEMENT)

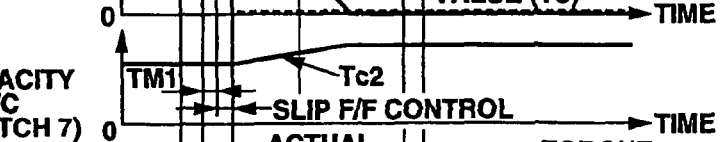

FIG.10D TORQUE CAPACITY OF H&LR/C (SECOND CLUTCH 7)

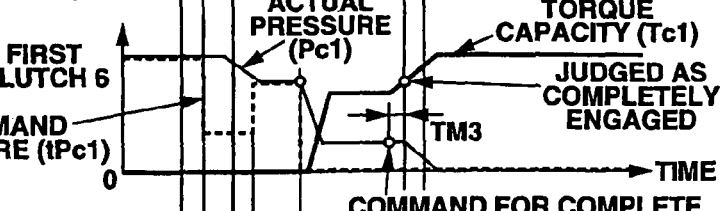

FIG.10E FIRST CLUTCH 6

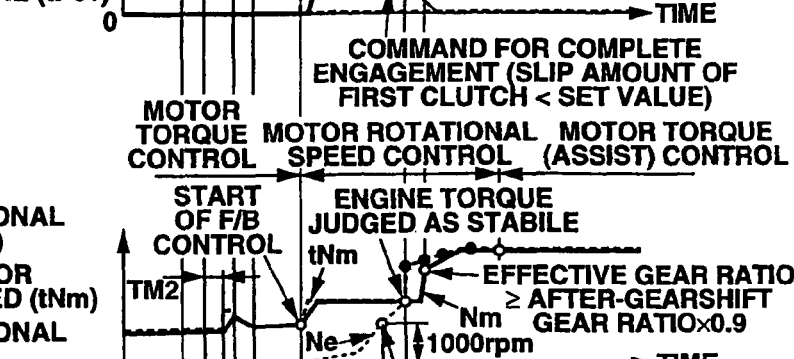

FIG.10F MOTOR ROTATIONAL SPEED (Nm) TARGET MOTOR ROTATIONAL SPEED (tNm) ENGINE ROTATIONAL SPEED (Ne)

FIG.10G ENGINE TORQUE (Te)

FIG.10H MOTOR TORQUE (Tm)

FIG.10I TRANSMISSION OUTPUT TORQUE

DRIVE STATE SHIFT CONTROL APPARATUS FOR HYBRID VEHICLE

CROSS-REFERENCE TO RELATED APPLICATION

This application claims priority from Japanese Patent Application Serial No. 2006-128436, filed May 2, 2006, which is incorporated herein in its entirety by reference.

TECHNICAL FIELD

The invention relates in general to a hybrid vehicle capable of running with power from a motor generator in addition to an engine.

BACKGROUND

Hybrid vehicles have an electric drive (EV) mode, in which the hybrid vehicle travels only by power from the motor-generator, and a hybrid drive (HEV) mode, in which the hybrid vehicle can travel by power from both the engine and the motor-generator. Hitherto, various types of hybrid driving devices used in hybrid vehicles have been proposed.

Japanese Patent Application Publication No. 11-082260 shows one type of such a hybrid drive system. The hybrid drive system disclosed therein includes a motor-generator disposed between an engine and a transmission as a result of connecting an output shaft of the engine and an input shaft of the transmission. A first clutch connects the engine to the motor-generator so that they can be separated from each other. A second clutch connects an output shaft of the transmission and the motor-generator so that they can be separated from each other.

When the first clutch is disengaged, and the second clutch is engaged, the hybrid vehicle including the hybrid driving device is put in the electric drive (EV) mode in which the hybrid vehicle travels only by power from the motor-generator. When the first and second clutches are both engaged, the hybrid vehicle including the hybrid driving device is put in the hybrid drive (HEV) mode in which the hybrid vehicle can travel by power from both the engine and the motor-generator.

In the hybrid vehicle, engine output becomes unnecessary when it has become possible to generate a required driving force only by the motor-generator as a result of a reduction in the required driving force. Such a reduction is caused by, for example, a driver taking is his/her foot off a depressed accelerator pedal when the hybrid vehicle is traveling in the HEV mode. Then, the HEV mode is switched to the EV mode. Another situation when HEV mode is switched to EV mode is when battery power for the motor-generator is sufficient, requiring no engine output. On the other hand, when the vehicle is running in EV mode and the required driving force is increased in response to a request for acceleration, such as depressing the accelerator pedal, a shift from EV mode to HEV mode will occur. This requires engine output, because it is impossible to attain the requested driving force only by the motor-generator. The mode shift from EV to HEV will also occur when the charge of the battery for the motor-generator is insufficient, requiring engine output.

According to this known device, it is necessary to perform the mode switching from HEV to EV while disengaging the first clutch and stopping the engine. During the EV-to-HEV mode shift, it is necessary to engage the first clutch to start the engine by using the motor-generator. Further, in some cases, depressing the accelerator pedal causes a request to shift gears of the transmission simultaneously therewith. Further, in some cases, releasing the accelerator pedal causes gear shifting of the transmission simultaneously therewith.

BRIEF SUMMARY

Embodiments of a drive state shift control apparatus for a hybrid vehicle and methods of controlling a hybrid vehicle are taught herein. A control apparatus for a hybrid vehicle according to one embodiment taught herein comprises an engine, a motor-generator, a first clutch disposed between the engine and the motor-generator for engagement and disengagement, a second clutch disposed between the motor generator and a driving wheel for engagement and disengagement, a transmission disposed between the motor generator and the driving wheel and a controller. The controller is operable to selectively provide a mode shift between an electric drive mode in which the first clutch is disengaged and the second clutch is engaged and a hybrid drive mode in which the first clutch and the second clutch are engaged, to selectively provide a gear shift in the transmission and to perform two driving power transmission state shifts including the mode shift and the gear shift in accordance with a timing based on vehicle information including at least one of vehicle speed and engine load when a request for the mode shift and a request for the gear shift are received at or substantially at a same time.

Other embodiments of a drive state shift control apparatus for a hybrid vehicle are also taught herein. The hybrid vehicle includes an engine and a motor-generator switchable between an electric drive mode and a hybrid drive mode during a mode shift and a transmission switchable between a plurality of gear shift positions during a gear shift. The apparatus in this example comprises means for receiving a request for a mode shift and a request for a gear shift at or substantially at a same time, means for receiving vehicle information including at least one of a vehicle speed and an engine load and means for performing the mode shift and the gear shift in a sequence based on the vehicle information when the receiving means receives the requests.

Drive state shift control methods for a hybrid vehicle are also taught herein. One such method comprises receiving a request for a mode shift and a request for a gear shift at or substantially at a same time, receiving vehicle information including at least one of a vehicle speed and an engine load and performing the mode shift and the gear shift in a sequence based on the vehicle information after receiving the requests.

BRIEF DESCRIPTION OF DRAWINGS

The description herein makes reference to the accompanying drawings wherein like reference numerals refer to like parts throughout the several views, and wherein:

FIG. 6 is an engagement logic diagram showing selected gears of the automatic transmission of FIG. 4 in relation to combinations of engagement of shifting friction elements in the automatic transmission;

FIGS. 9A through 9I are collectively referred to as FIG. 9 and illustrate an operation time chart set of an EV-to-HEV mode shift control and a fifth-to-fourth downshift control carried out by the integrated controller of the control system of FIG. 7 under soft acceleration;

FIGS. 10A through 10I are collectively referred to as FIG. 10 and illustrate an operation time chart set of an EV-to-HEV mode shift control and a fifth-to-fourth downshift control carried out by the integrated controller of the control system of FIG. 7 under hard acceleration.

DETAILED DESCRIPTION OF EMBODIMENTS OF THE INVENTION

Figure 1:
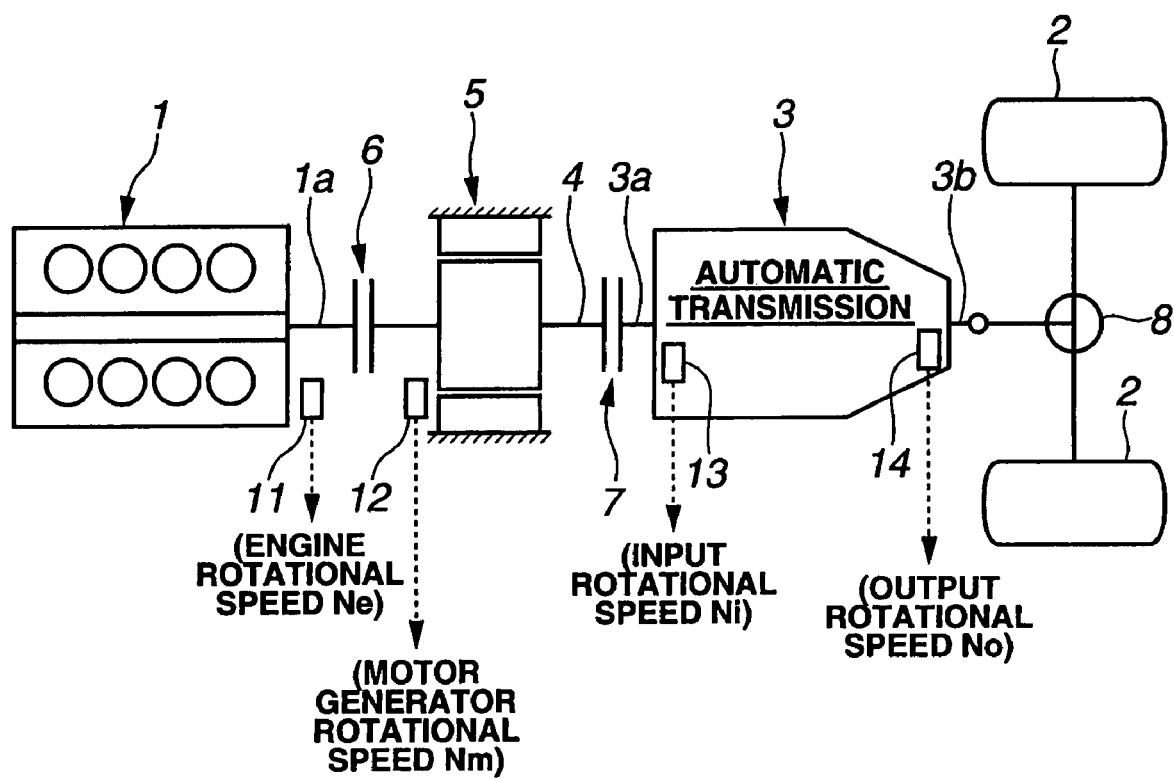
FIG. 1 is a schematic plan view of a hybrid vehicle powertrain to which a drive state shift control apparatus according to an embodiment of the invention is applicable.

In order to satisfy the known requirements above, it has been suggested that, in the situation where the first clutch is engaged or disengaged and the engine is started or stopped in the mode shift, or where gear shifting is carried out in the mode shift, the second clutch which is provided in the driveline between the motor-generator and the driving wheels be disengaged. This may shorten the time intervals for starting or stopping the engine and performing the gear shift, and therefore effectively reduce torque fluctuations and their transmission to the driving wheels.

However, this countermeasure causes a problem of uncomfortable feel, especially when the accelerator pedal is pressed. This is because when the second clutch is disengaged, the driving wheels are completely separated from the power sources, causing an unintended drop in the driving force.

Further, in order to reduce shock and unintended driving force reduction, instead of the disengaging the second clutch completely, the second clutch could be controlled to continuously transmit driving torque to the driving wheels during mode shifts or gear shifts. However, when acceleration is requested, requiring a mode shift and a gear shift, a sequence control for gear shifting is carried out after a sequence control for mode shifting, or conversely, the sequence control for mode shifting is carried out after the sequence control for gear shifting. This requires an extended time interval to complete both the mode shift and gear shift.

As described above, the process of performing the mode shift and the gear shift in turn with the second clutch reduces shock and unintended driving force reduction, yet adversely affects the response time for mode shifting and gear shifting. Conversely, the process of performing mode shifting and gear shifting in parallel improves the response time, yet increases shock and unintended driving force drop.

Accordingly, embodiments of the invention provide at least two driving power transmission state shifts including a mode shift and a gear shift performed in timing according to vehicle operating information. It is thus possible to satisfy the conflicting requests, i.e., the request for solving the problems as to shock and unintended driving force drop, and the request for improving the response of mode shift and gear shift.

During vehicle operating states in which it is suitable to solve with higher priority the problems as to shock and unintended driving force drop than the response of start or stop of the engine (mode shift), the start or stop of the engine (mode shift) and the gear shift are performed in turn. During vehicle operating states in which it is suitable to prioritize more highly the response of start or stop of the engine (mode shift) than the problems as to shock and unintended driving force drop, the start or stop of the engine (mode shift) and the gear shift are performed in parallel.

According to teachings herein, the hybrid vehicle includes an engine and a motor-generator, which serve as power sources. A first clutch is disposed between the engine and the motor-generator and has a changeable torque transfer capacity. A second clutch is disposed between the motor-generator and a driving wheel and has a changeable torque transfer capacity. In the hybrid vehicle, an electric drive mode in which the hybrid vehicle travels only by power from the motor-generator as a result of disengaging the first clutch and engaging the second clutch is selectable. In addition, a hybrid drive mode in which the hybrid vehicle travels by power from both the engine and the motor-generator as a result of engaging both the first and second clutches is selectable.

Embodiments of the invention are described in detail herein with reference to the drawings.

FIG. 1 shows a powertrain of a front engine, rear wheel drive, hybrid vehicle including a hybrid drive system to which a drive state mode shifting control apparatus according to embodiments of the invention is applicable. In the hybrid vehicle powertrain of FIG. 1, an automatic transmission 3 is disposed in tandem behind an engine 1 in the front-back direction of the vehicle, as in common rear wheel drive vehicles.

Disposed between engine 1 and automatic transmission 3, the motor-generator 5 operates as an electric motor or as an electric generator. A first clutch 6 is inserted between motor-generator 5 and engine 1, more specifically between shaft 4 and the engine crank shaft 1*a*. First clutch 6 selectively connects and disconnects engine 1 to and from motor generator 5.

Here, torque transfer capacity of the first clutch 6 can be changed continuously or in steps. The first clutch 6 is, for example, a wet-type multi-plate clutch having a torque transfer capacity varied by continuously controlling the flow rate and pressure of a clutch operating fluid with a linear solenoid valve.

A second clutch 7 is inserted between the motor-generator 5 and automatic transmission 3, more specifically between the shaft 4 and a transmission input shaft 3*a*. Second clutch 7 selectively connects and disconnects motor generator 5 to and from automatic transmission 3. As in the case of first clutch 6, torque transfer capacity of the second clutch 7 can be changed continuously or in steps. The second clutch 7 is, for example, a wet-type multi-plate clutch having a torque transfer capacity varied by continuously controlling the flow rate and pressure of a clutch operating fluid with a linear solenoid valve.

The automatic transmission 3 can be the same as the one described from pages C-9 to C-22 in "Description of Skyline New Model Car (CV35)" issued by Nissan Motor Co., Ltd., in January, 2003. A transmission path (shift gear) is determined by selectively engaging and disengaging a plurality of transmission friction elements (such as clutches and brakes) and combining the engagements and disengagements of the transmission friction elements. Therefore, the automatic transmission 3 changes the speed of rotation from the input shaft 3*a* at a gear ratio in accordance with the selected gear and outputs the resulting rotation to an output shaft 3*b*. The output rotation is distributed and transmitted to the left and right rear wheels 2 by a differential gear unit 8 to cause the vehicle to travel. Of course, the automatic transmission 3 may be a continuous variable transmission (CVT) in addition to the described stage transmission.

Figure 4:
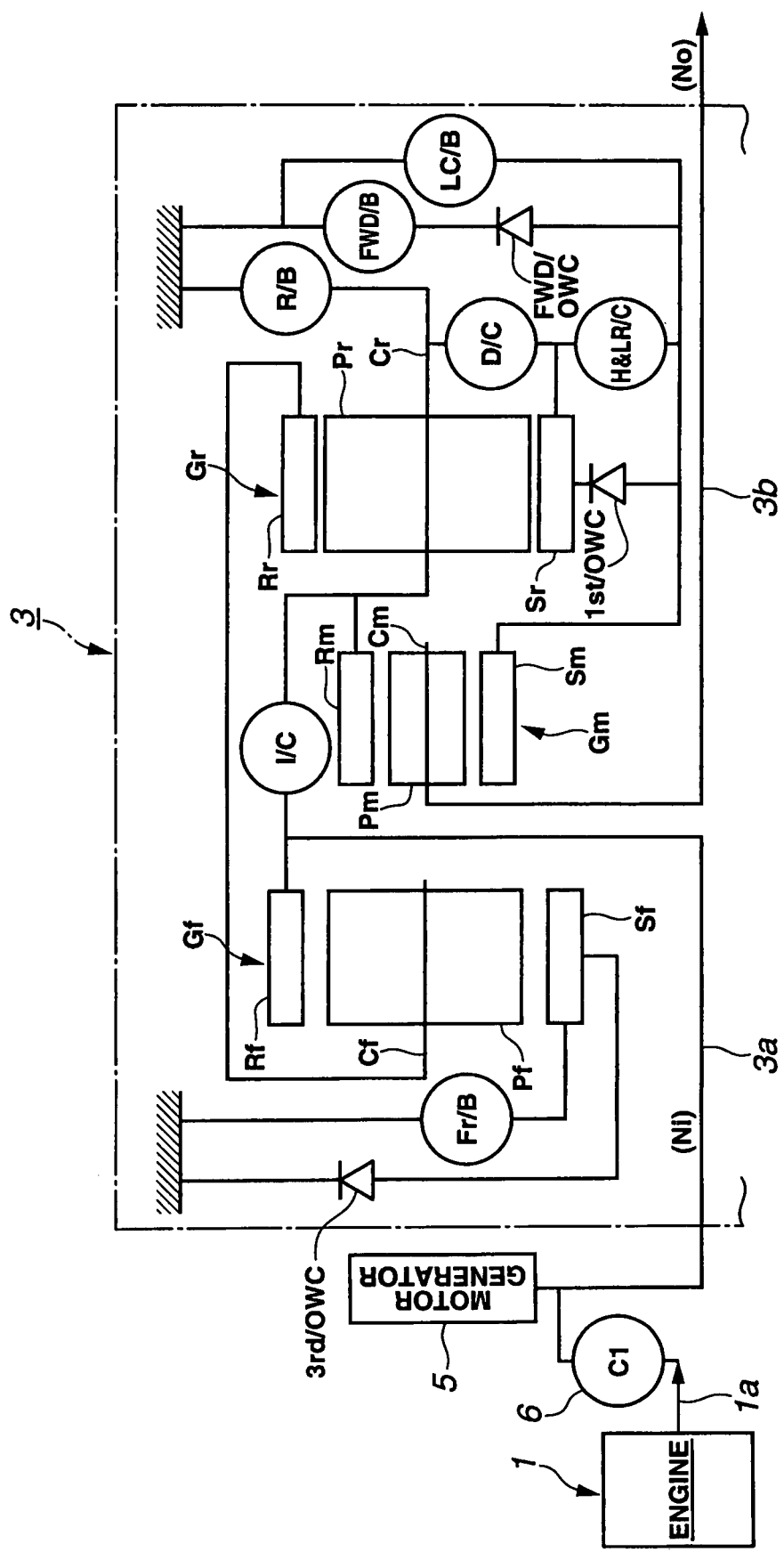
FIG. 4 is a skeleton diagram showing an automatic transmission in the powertrains of FIGS. 1 to 3.

The automatic transmission 3 is shown in FIG. 4. As shown in FIG. 4, the input shaft 3a and output shaft 3b are disposed so as to be coaxially abutted against each other. From the engine 1 side, a front planetary gear group Gf, a central planetary gear group Gm and a rear planetary gear group Gr are disposed in that order above the input shaft 3a and output shaft 3b.

The front planetary gear group Gf, which is closest to the engine 1, is a simple planetary gear group including a front sun gear Sf, a front ring gear Rf, a front pinion gear Pf that engages these gears Sf and Rf and a front carrier Cf that rotatably supports the front pinion Pf.

The center planetary gear group Gm, which is the next closest gear group to the engine 1, is a simple planetary gear group including a center sun gear Sm, a center ring gear Rm, a center pinion Pm that engages these gears Sm and Rm, and a center carrier Cm that rotatably supports the center pinion Pm.

The rear planetary gear group Gr, which is furthest from the engine 1, is a simple planetary gear group including a rear sun gear Sr, a rear ring gear Rr, a rear pinion Pr that engages these gears Sr and Rr, and a rear carrier Cr that rotatably supports the rear pinion Pr.

A front brake Fr/B, an input clutch I/C, a high-and-low-reverse clutch H&LR/C, a direct clutch D/C, a reverse brake R/B, a low-coast brake LC/B and a forward brake FWD/B are provided as transmission friction elements that determine a transmission path (shift gear) of the planetary gear transmission mechanism. These transmission friction elements along with three one-way clutches are brought into mutual relationship with planetary gear groups Gf, Gm and Gr as described below to form the planetary gear transmission mechanism of the automatic transmission 3. The three one-way clutches include a third-gear one-way clutch 3rd/OWC, a first-gear one-way clutch 1st/OWC and a forward one-way clutch FWD/OWC.

The front ring gear Rf is connected to the input shaft 3a, and the center ring gear Rm can be connected to the input shaft 3a as required by the input clutch I/C. The front sun gear Sf is prevented from rotating in a direction that is opposite to a direction of rotation of the engine 1 through the third-speed one-way clutch 3rd/OWC and can be fixed as appropriate by the front brake Fr/B that is disposed parallel to the third-speed one-way clutch 3rd/OWC. The front carrier Cf is connected to rear ring gear Rr, and the center ring gear Rm is connected to the rear carrier Cr.

The center carrier Cm is connected to the output shaft 3b. With regard to the center sun gear Sm and the rear sun gear Sr, the center sun gear Sm is prevented from rotating in a direction opposite to the direction of rotation of the engine 1 with respect to the rear sun gear Sr through the first-speed one-way clutch 1st/OWC, and the center sun gear Sm and the rear sun gear Sr can be connected to each other by the high-and-low reverse clutch H&LR/C.

The rear sun gear Sr and the rear carrier Cr can be connected to each other by the direct clutch D/C, and the rear carrier Cr can be fixed as appropriate by the reverse brake R/B.

The center sun gear Sm is further prevented from rotating in a direction opposite to the direction of rotation of the engine 1, when the forward brake FWD/B is engaged, by the forward brake FWD/B and the forward one-way clutch FWD/OWC. In addition, the center sun gear Sm can be fixed as appropriate by the low-coast brake LC/B. Accordingly, the low-cost brake LC/B is provided in parallel with the forward brake FWD/B and the forward one-way clutch FWD/OWC.

Figure 5:
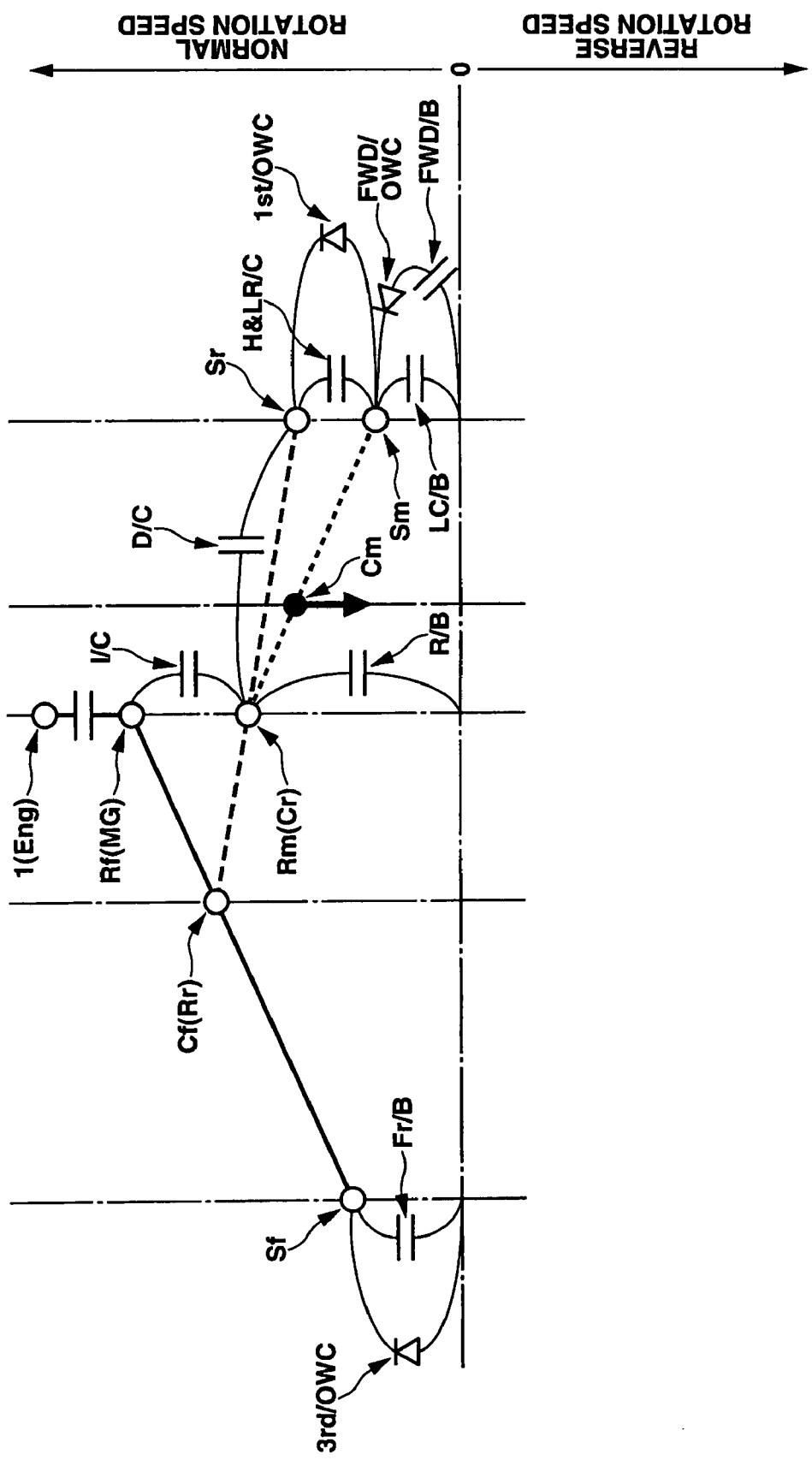
FIG. 5 is a speed diagram of the automatic transmission of FIG. 4.

FIG. 5 shows a power transmission arrangement of the above-described planetary gear shift mechanism. A power transmission train of the planetary gear transmission mechanism can provide forward gears (that is, a forward first speed (1st gear), a forward second speed (2nd gear), a forward third speed (3rd gear), a forward fourth speed (4th gear) and a forward fifth speed (5th gear)) and a reverse shift gear (Rev) as a result of selective engagements. The selective engagements of the seven transmission friction elements Fr/B, D/C, I/C, H&LR/C, R/B, LC/B and FWD/B and of the three one-way clutches 3rd/OWC, 1st/OWC and FWD/OWC are indicated by white circles and black circles (when engine braking) as shown in FIG. 6.

As shown in FIG. 6, the white, or clear, circles mean that the friction (or engagement) element (e.g., I/C or H&LR/C) is always engaged at that speed ratio. For example, H&LR/C at third speed gear ratio is a clear circle, which means that whether the vehicle is accelerating or coasting the H&LR/C clutch is engaged at the third speed gear ratio. In contrast, the friction element Fr/B at the third speed gear ratio is a black circle. This means that the friction element, brake Fr/B, disengages when the vehicle is accelerating (that is, the brake Fr/B is engaged when the vehicle is coasting with the engine brake.)

In the power train shown in FIG. 1, which includes the above-described automatic transmission 3, the first clutch 6 is disengaged, the second clutch 7 is engaged, and the automatic transmission 3 is set in a power transmission state when an electric drive (EV) mode is required. The EV mode is used during a low-load or a low-speed state such as when starting a stopped vehicle.

The powertrain includes an electric drive mode (EV mode). The EV mode is employed under low load and low vehicle speed conditions, such starting a stopped vehicle. When the EV mode is requested, the first clutch 6 is disengaged, and the second clutch 7 is engaged.

When motor generator 5 is driven under this condition, only output rotation from the motor generator 5 is transmitted to the transmission input shaft 3a. Automatic transmission 3 changes the speed of the rotation towards the input shaft 3a in accordance with a selected gear and outputs this rotation from the transmission output shaft 3b. Thereafter, the rotation from the transmission output shaft 3b reaches the rear wheels 2 through the differential gear unit 8 so that the vehicle can be subjected to electric driving (EV driving) by only the motor-generator 5.

When a hybrid drive (HEV drive) mode is required, the first clutch 6 and the second clutch 7 are engaged, and the automatic transmission 3 is set in a power transmission state. The HEV mode is used when traveling at a high speed, when traveling under a high load, when the remaining amount of battery capacity is small, etc.

In this state, output rotation from the engine, or the output rotation from the engine 1 and output rotation from the motor-generator 5, reach the transmission input shaft 3a so that the automatic transmission 3 changes the speed of the rotation towards the input shaft 3a in accordance with a selected gear and outputs this rotation from the transmission output shaft 3b. Thereafter, the rotation from the transmission output shaft 3b reaches the rear wheels 2 through the differential gear unit 8 so that the vehicle can be subjected to hybrid driving (HEV driving) by both the engine 1 and the motor-generator 5.

In HEV driving, when there is excess energy when the engine 1 is operated at optimum fuel consumption, this excess energy is used to operate the motor-generator 5 as a generator so that the excess energy is converted into electrical power. By storing the generated power so as to be used for motor driving of the motor-generator 5, it is possible to improve the fuel consumption of the engine 1.

In FIG. 1, the second clutch 7 is arranged between motor generator 5 and automatic transmission 3 for selectively connecting and disconnecting the motor generator 5 to and from driving wheels 2. However, the second clutch 7 may be arranged between automatic transmission 3 and differential gear 8 as shown in FIG. 2 to serve the similar functions.

Figure 2:
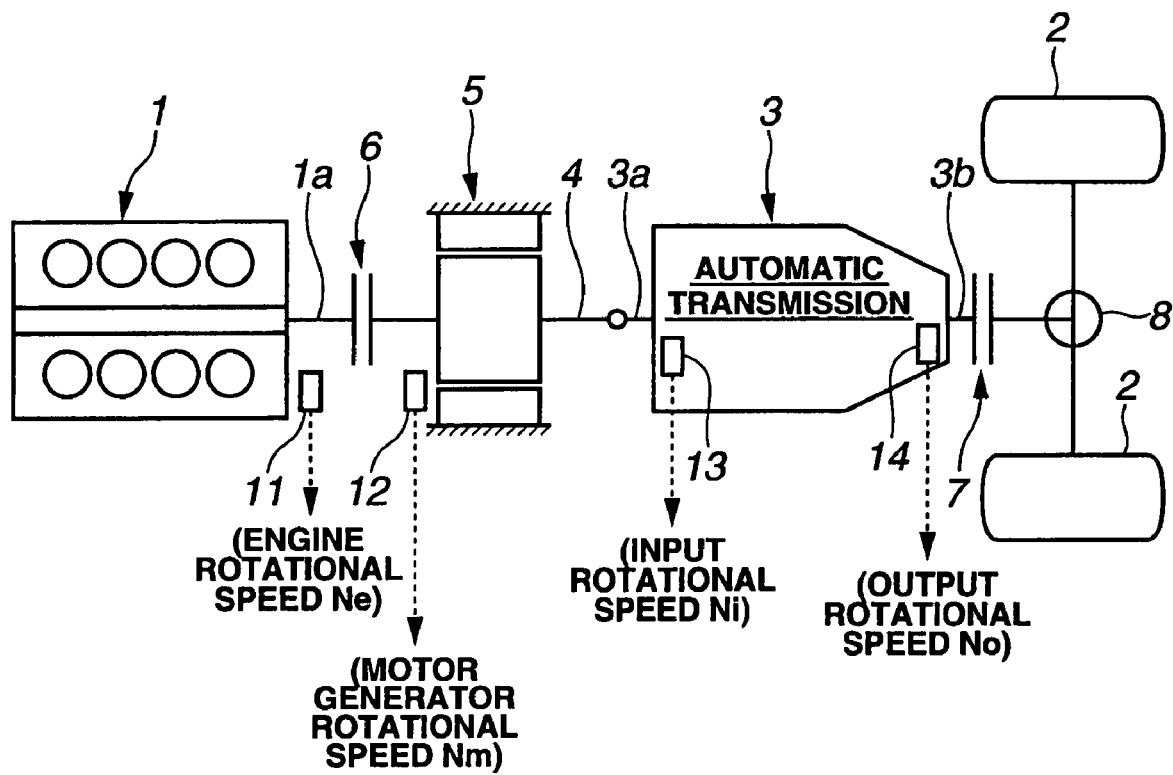
FIG. 2 is a schematic plan view of another hybrid vehicle powertrain to which the drive state shift control apparatus according to an embodiment of the invention is applicable.

In FIGS. 1 and 2, the second clutch 7 is added as a dedicated clutch in front of and behind the automatic transmission 3, respectively. However, the second clutch 7 may be a clutch used as a transmission friction element, which already exists in the automatic transmission 3, for selecting a forward gear or for selecting a reverse gear. A transmission friction element of the automatic transmission 3 that is used as the second clutch 7 is shown in FIG. 3.

In this case, in addition to performing the above-mentioned mode selection function, the second clutch 7 sets the automatic transmission in a power transmission state when it is engaged to achieve the function. Therefore, the structure shown in FIG. 3 is highly advantageous from the viewpoint of costs because a dedicated second clutch is not used.

Figure 3:
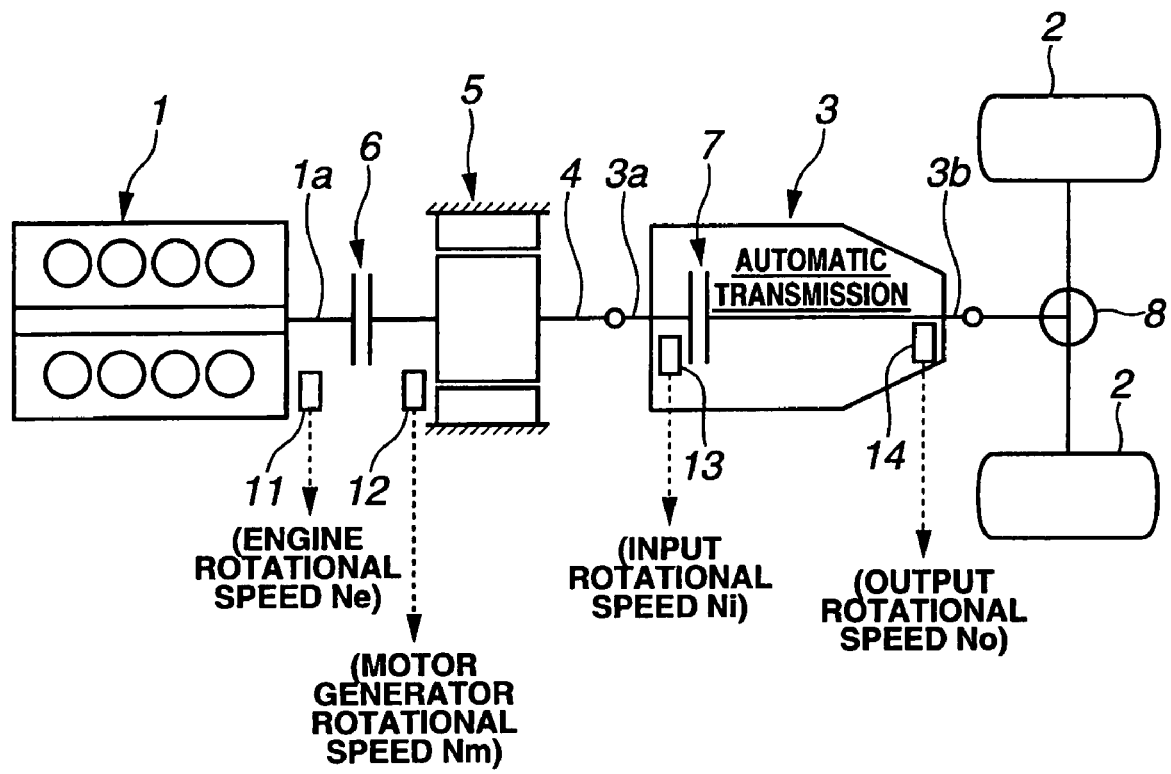
FIG. 3 is a schematic plan view of another hybrid vehicle powertrain to which the drive state shift control apparatus according to an embodiment of the invention is applicable.
Figure 7:
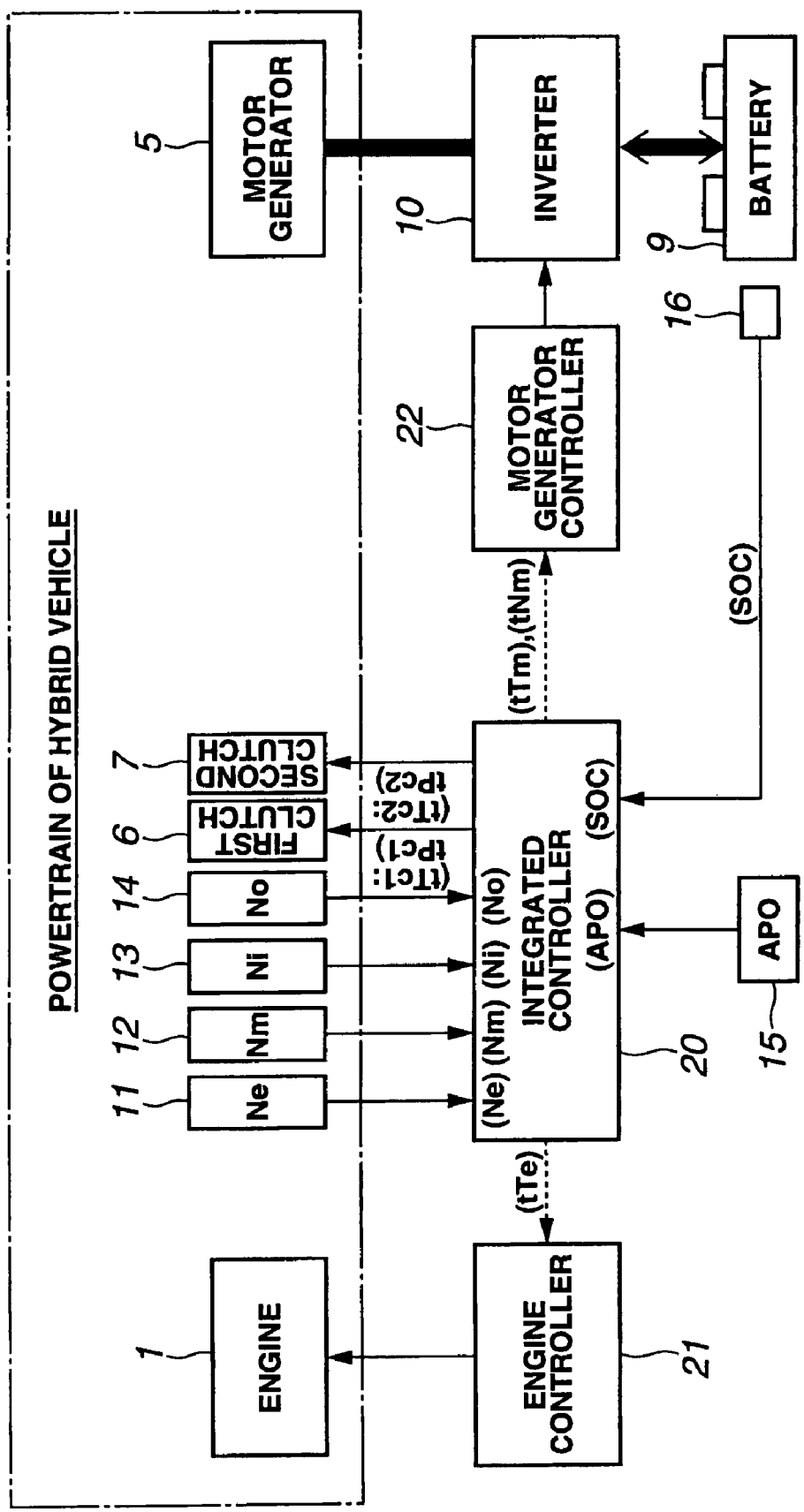
FIG. 7 is a block diagram showing a control system of the powertrain of FIG. 3.

The engine 1, the motor-generator 5, the first clutch 6 and the second clutch 7 of the powertrains of the hybrid vehicles shown in FIGS. 1 to 3 are controlled by a system shown in FIG. 7. In the description below, the powertrain shown in FIG. 3 (in which a transmission friction element that already exists in the automatic transmission 3 is the second clutch 7) is used.

The controlling system shown in FIG. 7 includes an integrated controller 20 that performs integration control of operation points of the powertrain. Each controller described herein, including the integrated controller 20, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed hereinafter. The functions of the integrated controller 20 described herein could be, for example, implemented in software as the executable programs, or could be implemented in whole or in part by separate hardware in the form of one or more integrated circuits (IC). Also, although the integrated controller 20 is shown as a separate device from the engine controller 21 and motor generator controller 22, the controllers can be implemented by a common device.

The operation points of the power train are defined by a target engine torque tTe, a target motor-generator torque tTm (or a target motor-generator rotational speed tNm), a target torque transfer capacity tTc1 (a first clutch command pressure tPc1) of the first clutch 6 and a target torque transfer capacity tTc2 (a second clutch command pressure tPc2) of the second clutch 7. To determine the operation points, several signals are input to the integrated controller 20. Namely, they are a signal from an engine rotation sensor 11 that detects an engine rotational speed Ne, a signal from a motor-generator rotation sensor 12 that detects a motor-generator rotational speed Nm, a signal from an input rotation sensor 13 that detects a transmission input rotational speed Ni, a signal from an output rotation sensor 14 that detects a transmission output rotational speed No, a signal from an accelerator opening sensor 15 that detects an accelerator pedal depression amount (accelerator opening APO) that indicates a requested load of the engine 1 and a signal from a storage state sensor 16 that detects a state of charge SOC (or electrical power that can be taken out) of a battery 9 that stores electrical power for the motor-generator 5.

Among these sensors, the engine rotation sensor 11, the motor-generator rotation sensor 12, the input rotation sensor 13 and the output rotation sensor 14 may be disposed as shown in FIGS. 1 to 3.

From the accelerator opening APO, the battery state of charge SOC and the transmission output rotational speed No (vehicle speed VSP), the integrated controller 20 selects a drive mode (EV mode or HEV mode) that can realize driving force of the vehicle desired by a driver. In addition, the integrated controller 20 calculates the target engine torque tTe, the target motor-generator torque tTM (or the target motor-generator rotational speed tNm), the target first clutch torque transfer capacity tTc1 (first clutch command pressure tPc1) and the target second clutch torque transfer capacity tTc2 (second clutch command pressure tPc2).

The target engine torque tTe is supplied to an engine controller 21, and the target motor-generator torque tTm (or target motor-generator rotational speed tNm) is supplied to a motor-generator controller 22. The engine controller 21 controls the engine 1 so that an engine torque Te becomes equal to the target engine torque tTe. The motor-generator controller 22 controls the motor-generator 5 through the battery 9 and an inverter 10 so that a torque Tm (or rotational speed Nm) of the motor-generator 5 becomes equal to the target motor-generator torque tTm (or target motor-generator rotational speed tNm).

The integrated controller 20 supplies solenoid electrical currents, which are in accordance with the target first clutch torque transfer capacity tTc1 (first clutch command pressure tPc1) and the target second clutch torque transfer capacity tTc2 (second clutch command pressure tPc2), to hydraulic control solenoids (not shown) of the first clutch 6 and the second clutch 7. The solenoid electrical currents are supplied to control engagement strengths of the respective first clutch 6 and the second clutch 7 so that a torque transfer capacity Tc1 (first clutch pressure Pc1) of the first clutch 6 becomes equal to the target torque transfer capacity tTc1 (first clutch command pressure tPc1) and a torque transfer capacity Tc2 (second clutch pressure Pc2) of the second clutch 7 becomes equal to the target second clutch torque transfer capacity tTc2 (second clutch command pressure tPc2).

Figure 8:
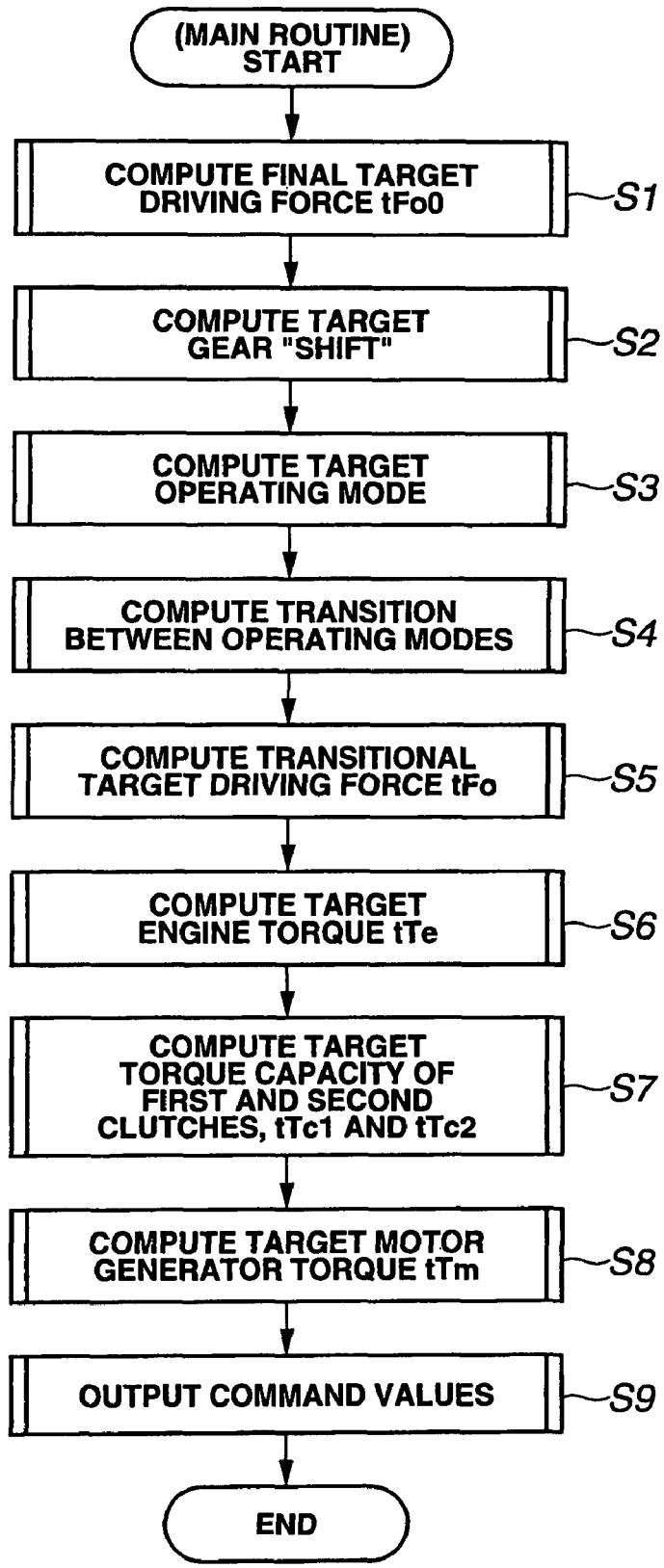
FIG. 8 is a flow chart showing a program of a basic driving force control that is carried out by an integrated controller of the control system.

By a main routine illustrated in FIG. 8, the integrated controller 20 selects the drive mode (EV mode or HEV mode) and calculates the target engine torque tTe, the target motor-generator torque tTm (or the target motor-generator rotational speed tNm), the target first clutch torque transfer capacity tTc1 (first clutch command pressure tPc1) and the target second clutch torque transfer capacity tTc2 (second clutch command pressure tPc2).

First, using a scheduled target driving force map, a steady target driving force tFo0 is calculated from the accelerator opening APO and the vehicle speed VSP in step S1.

In step S2 a target gear SHIFT is next determined from the accelerator opening APO and the vehicle speed VSP based on a scheduled gear shift map such as those known in the art. Then, in step S9 a command of the determination is given to a gear-shift controlling unit (not shown) of the automatic transmission 3 to shift the gear of the automatic transmission 3 to the target gear SHIFT.

In step S3 a target drive mode (EV mode or HEV mode) is determined from the accelerator opening APO and the vehicle speed VSP using a scheduled target drive mode area map. The target drive mode area map is determined so that, usually, the target drive mode is the HEV mode when the load is high (e.g., the accelerator opening is large) and the speed is high, and the target drive mode is the EV mode when the load and speed are low.

A drive mode transition is calculated as follows by comparing a current drive mode and the target drive mode with each other in the next step S4. That is, if the current drive mode and the target drive mode are the same, a command is given to maintain the current drive mode (EV mode or HEV mode). If the current drive mode is the EV mode, and the target drive mode is the HEV mode, a command is given to perform mode switching from the EV mode to the HEV mode. If the current drive mode is the HEV mode, and the target drive mode is the EV mode, a command is given to perform mode switching from the HEV mode to the EV mode. Then, the appropriate command is output in step S9 to maintain or switch the mode in accordance with the command.

In step S5 a transitional target driving force tFo, which is required for converting to the target driving force tFo0 obtained in step S1 with a predetermined response, is calculated from a current driving force. In calculating the transitional target driving force tFo, for example, an output that is obtained as a result of passing the target driving force tFo0 through a low-pass filter with a predetermined time constant may be used as the transitional target driving force tFo.

In step S6, in accordance with the drive mode (EV mode or HEV mode) or the mode switching, the target engine torque tTe that is required for achieving the transitional target driving force tFo with or without the cooperation of the motor-generator 5 is determined from the transitional target driving force tFo, a tire effective radius Rt of each driving wheel 2, a final gear ratio if, a gear ratio iG of the automatic transmission 3 determined by a currently selected gear, the input rotational speed Ni of the automatic transmission 3, the engine rotational speed Ne and a target discharge power tP in accordance with the battery state of charge SOC.

In step S9 a command regarding the target engine torque tTe that has been determined in this way is given to the engine controller 21 shown in FIG. 7 to cause the engine controller 21 to control the engine 1 so that the target engine torque tTe is achieved.

In step S7 the target torque transfer capacity tTc1 (clutch command pressure tPc1) of the first clutch 6 and the target torque transfer capacity tTc2 (clutch command pressure tPc2) of the second clutch 7 required for executing the mode switching or required for achieving the transitional target driving force tFo are determined in accordance with the drive mode (EV mode or HEV mode) or the mode switching.

In step S9 commands regarding the target torque transfer capacity tTc1 (clutch command pressure tPc1) of the first clutch 6 and the target torque transfer capacity tTc2 (clutch command pressure tPc2) of the second clutch 7 that have been determined in this way are given to the first clutch 6 and the second clutch 7 shown in FIG. 7 to control the engagement strengths of the first clutch 6 and the second clutch 7 so that the target transfer torque capacities tTc1 and tTc2 are achieved.

In step S8, in accordance with the drive mode (EV mode or HEV mode) or the mode switching, the target motor-generator torque tTm that is required for achieving the transitional target driving force tFo with or without the cooperation of the engine 1 is determined from the transitional target driving force tFo, the tire effective radius Rt of each driving wheel 2, the final gear ratio if, the gear ratio iG of the automatic transmission 3 determined by the currently selected gear, the input rotational speed Ni of the automatic transmission 3, the engine rotational speed Ne and the target discharge power tP in accordance with the battery state of charge SOC.

In step S9 a command regarding the target motor-generator torque tTm that has been determined in this way is given to the motor-generator controller 22 shown in FIG. 7 to cause the motor-generator controller 22 to control the motor-generator 5 so that the target motor-generator torque tTm is achieved.

The foregoing gives a description of a general controlling operation of driving force of a hybrid vehicle powertrain. Embodiments of the invention that perform an EV-to-HEV mode switching controlling operation are next described for a case in which, as illustrated in FIG. 9, the accelerator opening APO is increased softly due to increase in accelerator pedal depression at a time instant t1 so that a command for mode switching from the EV mode to the HEV mode is generated, and downshifting of the automatic transmission 3 from fifth gear into fourth gear is performed. FIG. 10 illustrates an embodiment in which the accelerator opening APO is increased sharply due to a hard accelerator pedal depression at time instant t1 so that a command for mode switching from the EV mode to the HEV mode is generated, and downshifting of the automatic transmission 3 from fifth gear into fourth gear is performed.

Figure 11:
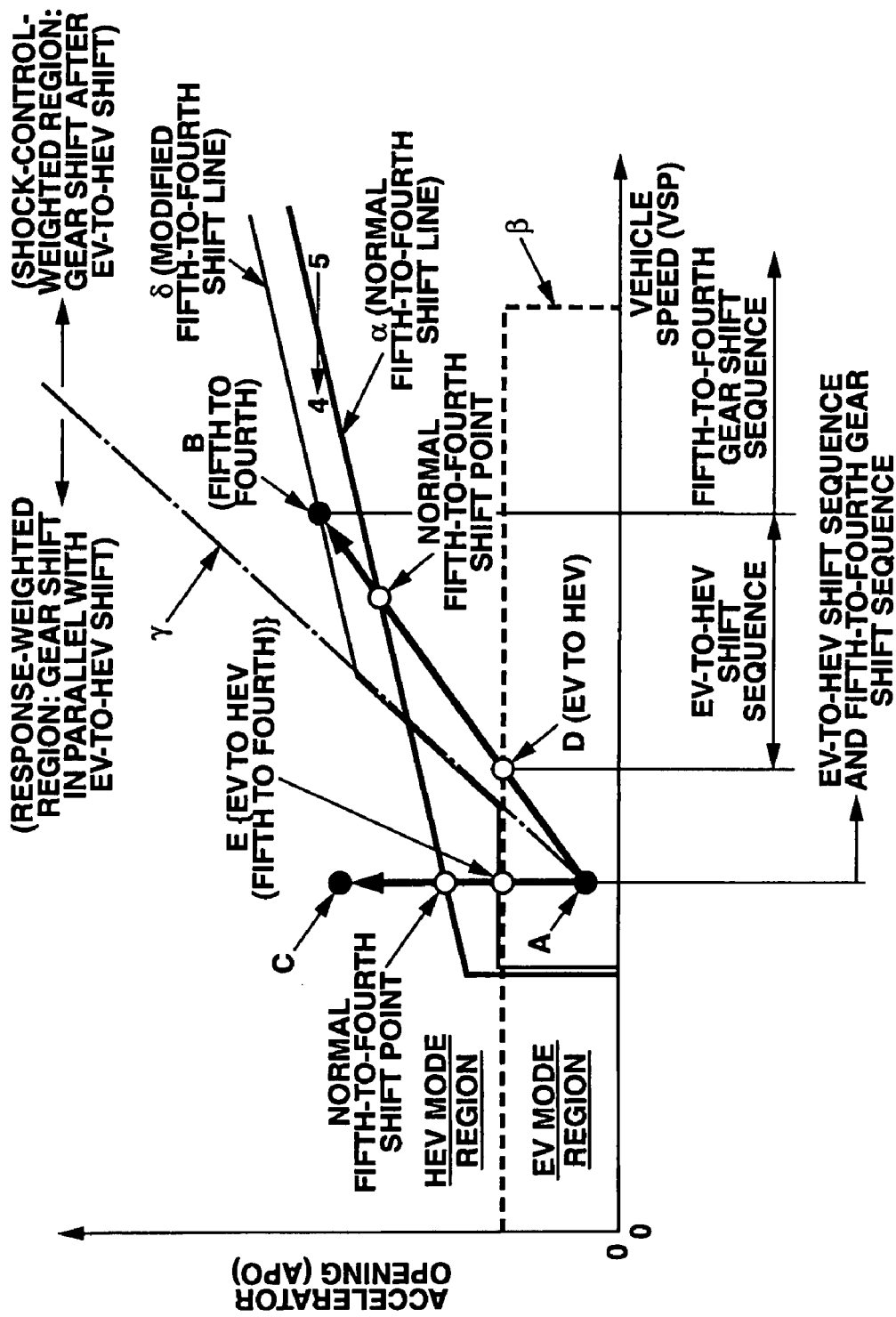
FIG. 11 is a shift diagram illustrating an example of modifying a shift line for fifth-to-fourth downshift in order to implement operations and advantageous effects according to an embodiment of the invention.

FIG. 11 illustrates a shift line a for a down shift from fifth-to-fourth gears and a boundary line β for the EV-to-HEV mode shift. In FIG. 11, each operating point represents a combination of vehicle speed VSP and accelerator opening APO. FIG. 9 illustrates an operation time chart for the situation where accelerator opening APO softly increases from an operating point "A" to an operating point "B" as shown in FIG. 11 so that the vehicle speed VSP rises simultaneously with the accelerator opening from the corresponding value of operating point "A" to the corresponding value of operating point "B". FIG. 10 shows an operation time chart for the situation where accelerator opening APO sharply increases from operating point "A" to an operating point "C" as shown in FIG. 11, with the corresponding vehicle speed VSP rise lagging behind.

In this embodiment, as shown in FIG. 11, a boundary line γ extends from the initial operating point "A" when the accelerator opening starts to increase and is defined by a gradient dependent on vehicle operating information. The vehicle operating information includes vehicle speed VSP, vehicle acceleration ΔVSP as the rate of change of vehicle speed VSP with respect time, accelerator opening APO indicative of requested engine load and accelerator operational speed ΔAPO as the rate of change of accelerator opening APO with respect to time.

Boundary line γ is between one region that puts weight on shock control and another region that puts weight on response time. More specifically, boundary line γ indicates a boundary (combination of vehicle speed VSP and accelerator opening APO) between a shock-control region and a response-time region. In the shock-control region, minimizing shock and unintended driving force drop are higher priority than the response time of mode shifting and gear shifting. In the response-time region, improving the response time for mode shifting and gear shifting is a higher priority than minimizing shock and unintended driving force drop. The shock-control region falls on the side of boundary line γ depicting higher speed and lower accelerator opening. The response-time region falls on the side of boundary line γ depicting lower speed and higher accelerator opening.

Modified shift line δ corresponds to fifth-to-fourth downshifting in the EV mode region distinguished by mode boundary line β. With increasing vehicle speed, the shift line δ follows the mode boundary line β. Then, the shift line δ follows the boundary line γ. Finally, the shift line δ extends in parallel to the shift line in HEV mode α but at a greater accelerator opening where the increase is dependent on the above vehicle operating information.

The gear shift and the mode shift are controlled in accordance with the modified shift line δ and mode boundary line β. The (normal) shift line δ is modified depending on vehicle operating information, i.e., depending on vehicle speed VSP, vehicle acceleration ΔVSP as the rate of change of vehicle speed VSP with respect time, accelerator opening APO indicative of requested engine load and accelerator operational speed ΔAPO as the rate of change of accelerator opening APO with respect to time (a gradient of accelerator opening APO with respect to vehicle speed VSP).

Considering the case of soft accelerator operation (that is, slow or "soft" operation of the accelerator pedal) illustrated in FIG. 9, showing a shift from operating points "A" to "B", the EV-to-HEV mode shift is first performed at an operating point "D" as shown in FIG. 11. After that, the fifth-to-fourth downshift is performed at operating point "B" lying on the modified shift line δ. The fifth-to-fourth downshift is performed after the EV-to-HEV mode shift. Accordingly, shock and unintended driving force drop are minimized.

On the other hand, hard accelerator operation (that is, quick or "hard" operation of the accelerator pedal) is illustrated in FIG. 10. In a shift from operating points "A" to "C", both the EV-to-HEV mode shift and the fifth-to-fourth downshift are performed at operating point "E" on FIG. 11, lying on both the modified shift line δ and mode boundary line β. The fifth-to-fourth downshift and the EV-to-HEV mode shift are performed in parallel. Accordingly, the response time of mode shifting and gear shifting is reduced.

The embodiment illustrated in FIG. 9 addresses the conflicting problems. In FIG.9, the accelerator opening APO slowly increases in response to soft depression of the accelerator pedal at time instant t1. When this occurs, a request for a shift from EV-to-HEV mode and a request for fifth-to-fourth downshifting are issued.

As described above, the electric drive mode (EV mode) is established by disengaging the first clutch 6, stopping the engine 1, and engaging the second clutch 7 so that the driving wheels 2 are powered only by output rotation from the motor-generator 5. The hybrid drive mode (HEV mode) is established by engaging the first clutch 6 and starting the engine 1 by the power supplied through the first clutch 6 so that the driving wheels 2 are driven with power from both of engine 1 and motor-generator 5. Accordingly, the EV-to-HEV mode shift is implemented by engaging the first clutch 6 and controlling the driving torque of motor-generator 5.

As shown by arrows in the engagement logic diagram of FIG. 6, the fifth-to-fourth downshift of automatic transmission 3 is implemented by disengaging the engaged front brake Fr/B (also called the disengagement element) and engaging the disengaged direct clutch D/C (also called the engagement element). Accordingly, here, the high-and-low-reverse clutch H&LR/C remains engaged to hold the automatic transmission 3 in the power transmission state, as also shown in FIG. 6. In this embodiment, the high-and-low-reverse clutch H&LR/C is used as second clutch 7 of FIG. 3.

Referring once again to FIG. 9, tTc2 and Tc2 respectively represent a command (or target) value and an actual value of the torque capacity of high-and-low-reverse clutch H&LR/C. The value tTc represents a command (or target) value, and Tc represents an actual value of the torque capacity of direct clutch D/C (engagement element). The value tTo represents a command (or target) value, and To represents an actual value of the torque capacity of front brake Fr/B (disengagement element). Also, tPc1 represents a command (or target) pressure of first clutch 6, Pc1 represents an actual pressure of first clutch 6 and Tc1 represents the torque capacity thereof. Under normal conditions (actual pressure Pc1=0), the first clutch 6 is engaged so that the torque capacity Tc1 is at its maximum. As actual pressure Pc1 rises to meet the command pressure tPc1, the torque capacity Tc1 falls.

FIG. 9 also illustrates a target rotational speed of motor-generator 5 tNm, an actual value thereof (motor-generator rotational speed) Nm, engine rotational speed Ne of engine 1, transmission input rotational speed Ni of automatic transmission 3, engine torque Te of engine 1, motor-generator torque Tm of motor-generator 5 and the transmission output torque.

As mentioned, in FIG. 9 the accelerator opening APO (indicating the requested driving force) starts to increase softly (or gradually) after time t1. In response, the motor-generator torque Tm and motor generator rotational speed Nm are increased. To transmit the increased motor generator torque Tm to driving wheels 2, the torque capacity Tc2 of high-and-low-reverse clutch H&LR/C (second clutch 7) is increased in correspondence to the target transmission output torque.

The increase in the accelerator opening APO requires the use of the engine power. Accordingly, at a time t2 the shift from EV-to-HEV mode is requested. Upon this request, the first clutch 6 is quickly readied for engagement, with torque capacity Tc1 remaining equal to zero. This is done by reducing the command pressure tPc1, as shown by a broken line, and controlling the actual pressure Pc1 to follow the command pressure tPc1 (by precharging control and standby control).

Time t3 is a predetermined time interval TM1 after the time t2 when the shift from EV-to-HEV mode is requested. At time t3 the rotational speed of motor-generator 5 is raised to start the engine 1. Specifically, the target motor-generator rotational speed tNm is increased to the determined value for engine start-up, and motor-generator torque Tm is increased, thereby increasing the motor-generator rotational speed Nm to the target motor-generator rotational speed tNm. As a result, the second clutch 7 starts to slip due to the increase in motor-generator torque Tm because torque capacity Tc2 of high-and-low-reverse clutch H&LR/C (second clutch 7) corresponds to the target transmission output torque.

To ensure the second clutch 7 softly starts to slip, the target motor-generator rotational speed tNm is raised to the target value for engine start-up through two steps as shown in FIG. 9. After the high-and-low-reverse clutch H&LR/C (second clutch 7) starts to slip, the target rotational speed tNm of motor-generator 5 is set to the sum of the target value for engine start-up and the slip rotational speed of second clutch 7 (high-and-low-reverse clutch H&LR/C).

After the second clutch 7 (high-and-low-reverse clutch H&LR/C) starts to slip, the time that the slip rotational speed is above the target value for engine start-up is monitored. Time t4 is when this time reaches a predetermined interval. After time t4, the command pressure tPc1 of first clutch 6 is slowly reduced so that the first clutch 6 starts to engage for power transmission. When first clutch 6 starts to engage, the torque capacity Tc1 of first clutch 6 causes the engine 1 to start as indicated by the curve of motor-generator rotational speed Nm and engine torque Te. Immediately after the time t4, the command pressure tPc1 of first clutch 6 (first clutch torque capacity Tc1) is determined so that the motor-generator rotational speed Nm rises to 1000 rpm in 0.3 second, or the like.

Time t6 occurs when the difference between engine rotational speed Ne and motor-generator rotational speed Nm, i.e., the slip rotational speed of first clutch 6, is equal to a predetermined value small enough to prevent shock due to clutch engagement. At time t6, the command pressure tPc1 of first clutch 6 is set to zero, thereby reducing the actual pressure Pc1, to maximize the torque capacity Tc1 and engage the first clutch 6 completely.

The fifth-to-fourth downshift request is issued at a time t5 between time t4 and t6. At time t5, the target torque capacity tTo of front brake Fr/B (disengagement element) is reduced comparable to the torque capacity of high-and-low-reverse clutch H&LR/C (second clutch 7). The actual torque capacity To of front brake Fr/B (disengagement element) is reduced to follow the target torque capacity tTo.

Thus, the front brake Fr/B starts to slip instead of high-and-low-reverse clutch H&LR/C (second clutch 7). After detection of front brake Fr/B slippage, the target torque capacity tTc2 of high-and-low-reverse clutch H&LR/C is raised to the value required for full engagement. Actual torque capacity Tc2 follows the second clutch target torque capacity tTc2 so that the high-and-low-reverse clutch H&LR/C is engaged completely. Thus, the slipping state shifts from high-and-low-reverse clutch H&LR/C to front brake Fr/B.

At time t5 when the fifth-to-fourth downshift is requested, the direct clutch D/C (engagement element) is quickly readied for engagement by raising the command torque capacity tTc, as shown by a broken line in FIG. 9, with the actual torque capacity T1 following the command torque capacity tTc (by precharging control and standby control).

After the first clutch 6 is engaged completely, as indicated by "judged as engaged completely" in FIG. 9, time t7 occurs when both the value of tTc2-Tm exceeds a predetermined value and the engine torque Te is stable. At time t7 the target rotational speed tNm of motor-generator 5 is raised to a target after-gearshift rotational speed with a predetermined time constant as indicated by a broken line. Motor-generator torque Tm is controlled so that the motor-generator rotational speed Nm follows the target motor-generator rotational speed tNm. Engagement of first clutch 6 is judged to be complete when one of the following two conditions is satisfied: (1) the torque capacity Tc1 reaches a predetermined value, or (2) a predetermined time interval TM2 has elapsed after time t6. Torque capacity Tc1 may be estimated on the basis of the stroke of first clutch 6.

Downshifting from fifth-to-fourth gears requires disengaging the front brake Fr/B (disengagement element) and engaging the direct clutch D/C (engagement element). Time t8 occurs when this fifth-to-fourth downshift is completed. Time t8 occurs, for example, when the transmission output rotational speed No reaches 90% of a final target value. At time t8 the target torque capacity tTo of front brake Fr/B is reduced toward zero with respect to time. This gradient is dependent on accelerator opening APO and vehicle speed VSP. As actual torque capacity To follows the target torque capacity tTo the front brake Fr/B is disengaged completely from the slip state, and the target torque capacity tTc of direct clutch D/C (engagement element) is set to the maximum. As torque capacity Tc reaches its target torque capacity tTc the direct clutch D/C is engaged completely. Thus, the fifth-to-fourth downshift is completed at time t9.

Shifting from EV-to-HEV mode is completed when a predetermined time interval has elapsed from the time the slip rotational speed of high-and-low-reverse clutch H&LR/C (second clutch 7) decreases below a predetermined value representing complete engagement.

The drive state shift control for soft acceleration of the hybrid vehicle operates by judging the soft acceleration based on vehicle operating information such as vehicle speed VSP, vehicle acceleration ΔVSP as the rate of change of vehicle speed VSP with respect time, accelerator opening APO representing requested engine load and accelerator operational speed ΔAPO as the rate of change of accelerator opening APO with respect to time. When both the shifts from EV-to-HEV mode and from fifth-to-fourth gear are requested in response, the shift in gears of automatic transmission 3 (i.e., the shift in power transmission path between motor generator 5 and driving wheels 2) is performed after the shift from EV-to-HEV mode. Thus, the sequence for reducing shocks due to the EV-to-HEV mode shift and the sequence for reducing shocks due to the fifth-to-fourth gear shift are provided separately, adversely affecting the response time.

The EV-to-HEV mode switching controlling operation according to the above-described embodiment provides the following operational advantages. During the EV-to-HEV mode shift, the first clutch 6 is engaged so that the motor-generator 5 starts the engine. During the gear shift of automatic transmission 3, the power transmission path between motor-generator 5 and automatic transmission 3 is shifted. At the time, the torque capacity Tc2 of second clutch 7 is set in accordance with the driving force required by the driver. Then, the torque capacity of the disengagement element (front brake Fr/B) is set in correspondence with torque capacity Tc2 of second clutch 7. That is, the shift from EV-to-HEV mode and shift in gears are performed by setting the torque capacity of the disengagement element (front brake Fr/B) in accordance with the driving force required by the driver, maintaining the driving force to driving wheels 2. This eliminates unintended driving force drop and shock by absorbing the excessive torque in the slip of second clutch 7 and the disengagement element (front brake Fr/B).

For similar reasons, the torque of motor-generator 5 is set above that requested by the driver. This allows engine 1 to be started by the surplus motor-generator torque while maintaining the driving torque to driving wheels 2. Further, shifting gears may be accomplished by disengaging the disengagement element (front brake Fr/B) and engaging the engagement element (direct clutch D/C) during the engine start-up. Although shock control is prioritized higher than response times, the required response time for engine start-up and gear shifting is not significantly lengthened.

FIG. 10 illustrates drive state shift control when the accelerator opening APO relatively quickly increases at time t1 in response to a hard depression of the accelerator pedal, causing a request for shifts from EV-to-HEV mode and fifth-to-fourth gears. In FIG. 10 where the same notifications represent similar signals in FIG. 9 the description of such notifications is omitted to avoid duplications.

As shown in FIG. 10, the accelerator opening APO sharply increases at time t1. In response, the motor-generator torque Tm and motor-generator rotational speed Nm increase. To transmit the increased motor-generator torque Tm to driving wheels 2, the torque capacity Tc2 of high-and-low-reverse clutch H&LR/C (second clutch 7) increases in correspondence to the target transmission output torque as shown in FIG. 10.

The increase in accelerator opening APO requires engine power. Accordingly, at time t2 the shift from EV-to-HEV mode is requested. In response to this request, the first clutch 6 is quickly readied for engagement, with torque capacity Tc1 remaining equal to zero, by reducing the command pressure tPc1, as shown by a broken line, with the actual pressure Pc1 following the command pressure tPc1 (by precharging control and standby control).

At time t3, a time interval after time t2, the torque capacity Tc2 of high-and-low-reverse clutch H&LR/C (second clutch 7) is set to a predetermined value for feedforward control (F/F control) of clutch slip. This clutch slip feedforward control (F/F control) is carried out until time t4. At time t4 the fifth-to-fourth gear shift is requested. As a result, the high-and-low-reverse clutch H&LR/C (second clutch 7) is allowed to slip in accordance with a surplus torque input. If the slip of second clutch 7 exceeds a predetermined value before time t4, then the controlling operation is shifted to the control operation illustrated in FIG. 9.

At a predetermined time interval TM2 after time t2 where the shift from EV-to-HEV mode is requested, the target motor-generator rotational speed tNm is raised to a target value for engine start-up, thereby increasing the rotational speed of motor-generator 5 for engine start-up. Motor-generator torque Tm is raised so that the motor-generator rotational speed Nm increases to meet the target motor-generator rotational speed tNm.

At time t4 the fifth-to-fourth downshift is requested. At time t4 the target torque capacity tTo of front brake Fr/B (disengagement element) is set to zero. Torque capacity To moves to attain the target torque capacity tTo so that the disengagement element (front brake Fr/B) shifts toward disengagement. Further, at time t4 the target torque capacity tTc of direct clutch D/C is raised as indicated by a broken line in FIG. 10. Actual torque capacity Tc increases to attain the target torque capacity tTc so that the direct clutch D/C is quickly readied for engagement (by precharging control and standby control).

Time t5 occurs when the front brake Fr/B starts to slip. At time t5 the first clutch 6, ready for engagement, is called to full engagement so the engine rotational speed Ne is increased for cranking. This is achieved by setting the command pressure tPc1 to zero, as indicated by a broken line in FIG. 10, so that the actual pressure Pc1 attains the command pressure tPc1, gradually raising the torque capacity Tc1. At this time, the torque capacity Tc1 of first clutch 6 is enough to raise the engine rotational speed Ne to 1000 rpm in 0.3 second, for example. First clutch 6 is commanded to completely engage (indicated by "command for complete engagement" in FIG. 10) when the slip of first clutch 6 falls below a predetermined value small enough to prevent shock.

At time t5, the target rotational speed tNm of the motor-generator 5 is raised to a target value required for engine start-up, thereby raising the rotational speed of motor-generator 5. Motor-generator torque Tm is raised so that the motor-generator rotational speed Nm can attain the target motor-generator rotational speed tNm. Torque capacity Tc2 of high-and-low-reverse clutch H&LR/C (second clutch 7) is set to a predetermined value according to the slip forward feedforward control (F/F control). Accordingly, the increase in motor-generator torque Tm causes the engine 1 to start as indicated by the curve of motor-generator rotational speed Nm and engine torque Te in FIG. 10.

At time t6 first clutch 6 is completely engaged, which is determined when the difference between torque capacity Tc2 of second clutch 7 (high-and-low-reverse clutch H&LR/C) and motor-generator torque Tm exceed a set value. At time t6, the target rotational speed tNm of motor-generator 5 is raised to a target after-gearshift rotational speed with a predetermined time constant as indicated by a broken line. Target motor-generator rotational speed tNm is raised in four steps in FIG. 10. Motor-generator torque Tm is controlled so that the motor-generator rotational speed Nm attains the target motor-generator rotational speed tNm.

The first clutch 6 is completely engaged (as indicated by "judged as engaged completely" in FIG. 10) when one of the following two conditions is first satisfied: (1) the torque capacity Tc1 reaches a predetermined value, or (2) a predetermined time interval TM3 has elapsed after the command for complete engagement of first clutch 6 (indicated by "command for complete engagement" in FIG. 10). Torque capacity Tc1 may be estimated based on the stroke of first clutch 6.

Time t7 occurs when the fifth-to-fourth downshift is complete, or when an effective gear ratio reaches 90% of the after-gearshift gear ratio (fourth gear). The effective gear ratio is defined as a ratio between the output rotational speed of automatic transmission 3 and the input rotational speed (motor-generator rotational speed Nm). At time t7 the direct clutch D/C (engagement element) is engaging completely by increasing the target torque capacity tTc, as indicated by a broken line in FIG. 10, and controlling the torque capacity Tc to attain the target torque capacity tTc. Time t8 occurs when at least one of the following two states continues: (1) the state where the slip of the engagement element (direct clutch D/C) is below a predetermined value; and (2) the state where the gear shift is completed so that the effective gear ratio is equal to the after-gearshift gear ratio (fourth gear). At time t8 the shift from EV-to-HEV mode is completed by shifting the control mode of motor-generator 5 from a rotational speed control into a torque control and shifting a driving torque from the motor-generator to the engine.

The drive state shift control for hard acceleration of the hybrid vehicle operates by judging the hard acceleration based on vehicle operating information, such as vehicle speed VSP, vehicle acceleration ΔVSP as the rate of change of vehicle speed VSP with respect to time, accelerator opening APO responsive to requested engine load and accelerator operational speed ΔAPO as the rate of change of accelerator opening APO with respect to time. When both the shifts from EV-to-HEV mode and fifth-to-fourth gear are requested, the gear shift of automatic transmission 3 (i.e., the shift in power transmission path between motor-generator 5 and driving wheels 2) is performed in parallel with the shift from EV-to-HEV mode, in which the first clutch 6 is engaged, and motor-generator 5 starts the engine. The shock control is adversely affected because the sequences for reducing shocks due to the shifts from EV-to-HEV mode and fifth-to-fourth gears are not provided separately.

A drive state shift control embodiment for hybrid vehicles is disclosed in which reduction of the response times for mode and gear shifting is a higher priority than shock control during rapid acceleration.

The torque of motor-generator 5 is set higher than that requested by the driver. The surplus motor-generator torque is used to start the engine 1 while maintaining the driving torque to driving wheels 2. Further, gear shifting may be performed by disengaging the disengagement element (front brake Fr/B) and engaging the engagement element (direct clutch D/C) in parallel during the engine start-up, reducing the time required for start-up and gear shifting.

To attain the operations and advantageous effects as described with reference to FIGS. 9 and 10, the shift line for fifth-to-fourth downshift is modified as described with reference to FIG. 11. Specifically, the shift line is modified in accordance with vehicle operating information such as vehicle speed VSP, vehicle acceleration ΔVSP as the rate of change of vehicle speed VSP with respect to time, accelerator opening APO representing requested engine load, and accelerator operational speed ΔAPO as the rate of change of accelerator opening APO with respect to time.

The foregoing embodiments address accelerator operations that cause simultaneous shifts in the EV-to-HEV mode and the gears. Another embodiment addresses accelerator operations that cause simultaneous shifts in the HEV-to-EV mode and gears, including an engine stop, with similar operations and advantageous effects. Yet another embodiment addresses factors other than accelerator operation, such as a change in vehicle speed VSP, which cause the simultaneous shifts from EV-to-HEV mode and the gears, producing similar operations and advantageous effects.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A drive state shift control apparatus for a hybrid vehicle, the hybrid vehicle including an engine and a motor-generator switchable between an electric drive mode and a hybrid drive mode during a mode shift and a transmission switchable between a plurality of gear shift positions during a gear shift, the apparatus comprising:

means for receiving a request for a mode shift and a request for a gear shift;

means for receiving vehicle information including at least one of a vehicle speed and an engine load; and means for determining a time for commencing performance of the gear shift and a time for commencing performance of the mode shift based upon a comparison of vehicle information to a threshold when the receiving means receives the request for the mode shift and the request for the gear shift at or substantially at a same time before commencing performance of both the mode shift and gear shift in response to their respective requests; and means for performing the mode shift between the electric drive mode and the hybrid drive mode and the gear shift.

2. A drive state shift control apparatus for a hybrid vehicle, comprising:

an engine;

a motor-generator;

a first clutch disposed between the engine and the motor-generator for engagement and disengagement;

a second clutch disposed between the motor generator and a driving wheel for engagement and disengagement;

a transmission disposed between the motor generator and the driving wheel; and a controller operable to:

selectively provide a mode shift between an electric drive mode in which the first clutch is disengaged and the second clutch is engaged and a hybrid drive mode in which the first clutch and the second clutch are engaged;

selectively provide a gear shift in the transmission;

receive a request for a mode shift and a request for a gear shift before commencing performance of a mode shift in response to the request for the mode shift and before commencing performance of a gear shift in response to the request for the gear shift, determine a time for commencing performance of the gear shift and a time for commencing performance of the mode shift, after receiving the respective requests, based upon a comparison of vehicle information that is related to at least one of a vehicle speed and an engine load to a threshold; and perform the mode shift at the time for commencing performance of the mode shift and perform the gear shift at the time for commencing performance of the gear shift.

3. The apparatus according to claim 2 wherein the mode shift is a mode shift from the electric drive mode to the hybrid drive mode.

4. The apparatus according to claim 2 wherein the gear shift is a downshift.

5. The apparatus according to claim 2 wherein the engine load corresponds to an accelerator opening.

6. The apparatus according to claim 2 wherein the second clutch is within the transmission.

7. The apparatus according to claim 2, wherein the request for the mode shift and the request for a gear shift are received in response to a single acceleration operation.

8. The apparatus according to claim 2, wherein the threshold varies as a function of at least one of a value related to the vehicle speed or a value related to the engine load.

9. The apparatus according to claim 2 wherein the controller is further operable to perform the gear shift in parallel with the mode shift when the vehicle information indicates a desire to minimize response time above a predetermined speed.

10. The apparatus according to claim 9 wherein the controller is further operable to conclude the vehicle information indicates the desire to minimize response time above the predetermined speed when a value related to the vehicle speed is lower than a predetermined speed value and when a value related to the engine load is larger than a predetermined load value.

11. The apparatus according to claim 2, wherein the controller is further operable to perform the gear shift after the mode shift is completed when the comparison of the vehicle information to the threshold indicates a desire to minimize shock.

12. The apparatus according to claim 11 wherein the controller is further operable to perform the gear shift in parallel with the mode shift when the comparison of the vehicle information to the threshold indicates a desire to minimize response time.

13. The apparatus according to claim 12 wherein the controller is further operable to conclude the vehicle information indicates the desire to minimize response time when a value related to the engine load is larger than the threshold, wherein the threshold varies as a function of a value related to the vehicle speed.

14. The apparatus according to claim 11 wherein the controller is further operable to conclude the vehicle information indicates the desire to minimize shock when a value related to the engine load is smaller than the threshold, wherein the threshold varies as a function of a value related to the vehicle speed.

15. The apparatus according to claim 14 wherein the controller is further operable to perform the gear shift in parallel with the mode shift when the comparison of the vehicle information to the threshold indicates a desire to minimize response time.

16. The apparatus according to claim 15 wherein the controller is further operable to conclude the vehicle information indicates the desire to minimize response time when the value related to the engine load is larger than the threshold, wherein the threshold varies as a function of a value related to the vehicle speed.

17. The apparatus according to claim 16 wherein the value related to the vehicle speed is the vehicle speed or an acceleration of the vehicle and wherein the value related to the engine load is an accelerator opening or a rate of change of the accelerator opening with respect to time.

18. A drive state shift control method for a hybrid vehicle, the hybrid vehicle including an engine and a motor-generator switchable between an electric drive mode and a hybrid drive mode during a mode shift and a transmission switchable between a plurality of gear shift positions during a gear shift, the method comprising:

receiving a request for a mode shift and a request for a gear shift in and before commencing performance of the mode shift in response to the request for the mode shift and before commencing performance of the gear shift in response to the request for the gear shift;

receiving vehicle information that is related to at least one of a vehicle speed and an engine load; and performing the mode shift between the electric drive mode and the hybrid drive mode and the gear shift in a sequence based on a comparison of the vehicle information to a threshold after receiving the requests.

19. The method according to claim 18 wherein performing the mode shift and the gear shift in the sequence based on the vehicle information after receiving the requests further comprises performing the gear shift after the mode shift is completed when the vehicle information indicates a desire to minimize shock.

20. The method according to claim 18, further comprising:
concluding the vehicle information indicates the desire to minimize shock when a value related to the engine load is smaller than the threshold, wherein the threshold varies as a function of a value related to the vehicle speed.

21. The method according to claim 18 wherein performing the mode shift and the gear shift in a sequence based on the vehicle information after receiving the requests further comprises performing a shift from the electric drive mode to the hybrid drive mode as the mode shift and performing a downshift as the gear shift in order or in parallel based on the comparison of the vehicle information to the threshold after receiving the requests.

22. The method according to claim 18 wherein performing the mode shift and the gear shift in the sequence based on the vehicle information after receiving the request further comprises performing the gear shift in parallel with the mode shift when the vehicle information indicates a desire to minimize response time.

23. The method according to claim 22, further comprising:
concluding the vehicle information indicates the desire to minimize response time when a value related to the engine load is larger than the threshold, wherein the threshold varies as a function of a value related to the vehicle speed.

* * * * *